(12) United States Patent
Vedula et al.

(10) Patent No.: US 11,455,235 B2
(45) Date of Patent: Sep. 27, 2022

(54) ONLINE QUERY EXECUTION USING A BIG DATA FRAMEWORK

(71) Applicant: PayPal, Inc., San Jose, CA (US)

(72) Inventors: Ramakrishna Vedula, San Ramon, CA (US); Lokesh Nyati, Kharadi Pune (IN)

(73) Assignee: PayPal, Inc., San Jose, CA (US)

(*) Notice: Subject to any disclaimer, the term of this patent is extended or adjusted under 35 U.S.C. 154(b) by 103 days.

(21) Appl. No.: 16/938,353

(22) Filed: Jul. 24, 2020

(65) Prior Publication Data
US 2022/0027258 A1 Jan. 27, 2022

(51) Int. Cl.
*G06F 16/215* (2019.01)
*G06F 16/248* (2019.01)
(Continued)

(52) U.S. Cl.
CPC ...... *G06F 11/3664* (2013.01); *G06F 11/3684* (2013.01); *G06F 11/3692* (2013.01); *G06F 11/3696* (2013.01); *G06F 16/284* (2019.01); *G06Q 20/4016* (2013.01); *G06F 11/3006* (2013.01); *G06F 16/2264* (2019.01);
(Continued)

(58) Field of Classification Search
CPC ............ G06F 11/3664; G06F 11/3684; G06F 11/3692; G06F 11/3696; G06F 11/3006; G06F 11/0754; G06F 16/284; G06F 16/2425; G06F 16/2455; G06F 16/27; G06F 16/2264; G06F 16/24578; G06F 16/24554; G06F 16/254; G06F 16/2358; G06F 16/2379; G06F 16/278; G06F 16/13;
(Continued)

(56) References Cited

U.S. PATENT DOCUMENTS 9,516,053 B1 * 12/2016 Muddu .............. H04L 63/1433
10,528,540 B2 * 1/2020 Gerweck ........... G06F 16/24542
(Continued)

OTHER PUBLICATIONS

Phuong Cao et al., Preemptive Intrusion Detection: Theoretical Framework and Real-World Measurements, 2015, [Retrieved on Apr. 13, 2022]. Retrieved from the internet: <URL: https://dl.acm.org/doi/pdf/10.1145/2746194.2746199> 12 Pages (1-12) (Year: 2015).*
(Continued)

*Primary Examiner* — Anibal Rivera
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to the execution of queries in an online manner. For example, in some embodiments, a server system may include a distributed computing system that, in turn, includes a distributed storage system operable to store transaction data associated with a plurality of users, and a distributed computing engine operable to perform distributed processing jobs based on the transaction data. In various embodiments, the server system preemptively creates a compute session on the distributed computing engine, where the compute session provides access to various functionalities of the distributed computing engine. The distributed computing engine may then use these preemptively created compute sessions to execute queries (e.g., for end users of the server system) against the transaction data and return the results dataset to the requesting users in an online manner.

20 Claims, 6 Drawing Sheets

(51) Int. Cl.
  *G06F 11/36*     (2006.01)
  *G06F 16/28*     (2019.01)
  *G06Q 20/40*     (2012.01)
  *G06F 16/242*    (2019.01)
  *G06F 16/2455*   (2019.01)
  *G06F 16/23*     (2019.01)
  *G06F 16/22*     (2019.01)
  *G06F 11/30*     (2006.01)

(52) U.S. Cl.
  CPC ...... *G06F 16/2358* (2019.01); *G06F 16/2425* (2019.01); *G06F 16/2455* (2019.01); *G06F 16/24554* (2019.01)

(58) Field of Classification Search
  CPC ............... G06F 16/901; G06F 11/3688; G06F 16/9538; G06Q 20/4016
  See application file for complete search history.

(56) References Cited

U.S. PATENT DOCUMENTS

| | | | | |
|---|---|---|---|---|
| 2016/0335318 | A1* | 11/2016 | Gerweck | G06F 16/2264 |
| 2017/0351585 | A1* | 12/2017 | Bourbonnais | G06F 16/27 |
| 2020/0218984 | A1* | 7/2020 | Thornton | H04L 9/3247 |
| 2020/0394455 | A1* | 12/2020 | Lee | G06K 9/6259 |

OTHER PUBLICATIONS

P.C. Chan et al., Preemptive Distributed Intrusion Detection using Mobile Agents, 2002 IEEE, [Retrieved on Apr. 13, 2022]. Retrieved from the internet: <URL: https://ieeexplore.ieee.org/stamp/stamp.jsp?tp=&arnumber=1029996> 6 Pages (1-6) (Year: 2002).*
What Is Apache Spark?; https://databricks.com/glossary/what-is-apache-spark; 2020, 3 pages. [Retrieved May 28, 2020].
Jules Damji, "How to use SparkSession in Apache Spark 2.0—A unified entry point for manipulating data with Spark," Posted in Engineering Blog Aug. 15, 2016; https://databricks.com/blog/2016/08/15/how-to-use-sparksession-in-apache-spark-2-0.html; 6 pages. [Retrieved May 28, 2020].
Spark SQL—Quick Guide; https://www.tutorialspoint.com/spark_sql/spark_sql_quick_guide.htm; 12 pages. [Retrieved Jun. 17, 2020].
Class SparkContext (Spark 2.4.6 JavaDoc); https://spark.apache.org/docs/latest/api/java/org/apache/spark/SparkContext; 34 pages. [Retrieved Jun. 16, 2020].
Class SparkSession (Spark 2.4.6 JavaDoc); https://spark.apache.org/docs/latest/api/java/org/apache/spark/sql/SparkSession; 18 pages. [Retrieved Jun. 16, 2020].
Slee et al., "Thrift: Scalable Cross-Language Services Implementation," Facebook, (Apr. 2007), 8 pages.
What is Apache Spark?; https://docs.microsoft.com/en-us/dotnet/spark/what-is-spark; Oct. 15, 2019, 3 pages. [Retrieved Jun. 17, 2020].
IBM Operational Decision Manager, What is IBM Operational Decision Manager?; https://www.ibm.com/products/operational-decision-manager, 5 pages. [Retrieved Jul. 23, 2020].
Hive—Introduction, tutorialspoint; https://www.tutorialspoint.com/hive/hive_introduction.htm, 5 pages. [Retrieved Jul. 23, 2020].
Hadoop—Introduction, tutorialspoint; https://www.tutorialspoint.com/hadoop/hadoop_introduction.htm, 3 pages. [Retrieved Jul. 23, 2020].
Introduction to Apache Spark, What is Apache Spark?, AWS; https://aws.amazon.com/big-data/what-is-spark/, 12 pages. [Retrieved Jul. 23, 2020].
Parquet, databricks; https://databricks.com/glossary/what-is-parquet, 3 pages. [Retrieved Jul. 23, 2020].
Krzysztof Rakowski, "Introduction to Apache Thrift," https://medium.com/techlabs-emag/introduction-to-apache-thrift-32bf78722b34, Jun. 30, 2016, 9 pages. [Retrieved Jul. 23, 2020].
Ravi Sandepudi, "A Primer on Machine Learning Models for Fraud Detection," Jun. 28, 2017; https://simility.com/blog/machine-learning/primer-machine-learning-models-fraud-detection-2/, 4 pages. [Retrieved Mar. 14, 2019].
Ravi Sandepudi, "Making Data a Competitive Advantage in the Fight Against Evolving Cyber Threats," https://simility.com/blog/making-data-a-competitive-advantage/, 3 pages. [Retrieved Mar. 14, 2019].
Kedar Samant, "White Paper: Machine Learning: The Secret Ingredient for Detecting and Preventing Fraud," Simility, 2017, 8 pages.
Rafael G. Mantovani, et al., "Hyper-parameter Tuning of a Decision Tree Induction Algorithm," 2016 5th Brazilian Conference on Intelligent Systems, pp. 37-42.

* cited by examiner

*400*

402
Provide, to a user device, interface data for a simulation interface that allows a user of the user device to simulate one or more modifications to a fraud detection filter prior to implementing the one or more modifications

404
Receive, from the user device, a simulation request that specifies, for a first fraud detection filter utilized by the user, one or more modified filter parameters

406
Based on the simulation request, generate a query designed to run the simulation on a dataset of transaction data corresponding to previous transactions associated with the user

408
Route the query to a distributed computing system that includes:

-A distributed computing engine on which a compute session has been preemptively created; and
-A distributed storage system in which the dataset of transaction data corresponding to the previous transactions associated with the user is stored in a column-oriented file format

410
Execute the query against the dataset of transaction data using the existing compute session to retrieve simulation results data

412
Return the simulation results data to the user device via the simulation interface

502
Maintain a distributed computing system that includes a plurality of computing nodes, where the distributed computing system includes:

-A distributed storage system operable to store transaction data associated with a plurality of users; and
-A distributed computing engine operable to perform distributed processing jobs based on the transaction data

504
Preemptively create a first compute session on the distributed computing engine, where the first compute session provides access to one or more functionalities of the distributed computing engine

506
Subsequent to preemptively creating the first compute session, receive, from a client device, a first data request associated with a first user of the plurality of users

508
Using the first compute session, execute, by the distributed computing engine, a query associated with the first data request against the transaction data to retrieve a results dataset

510
Sending the results dataset to the client device in an online manner

FIG. 5

ONLINE QUERY EXECUTION USING A BIG DATA FRAMEWORK

BACKGROUND

Technical Field

This disclosure relates generally to big data, and more particularly to executing queries in an online manner using a big data framework.

Description of the Related Art

The term "big data" refers to the collection of a variety of types of data in high volumes (e.g., gigabytes, terabytes, etc.) and at a high velocity (e.g., daily, hourly, etc.). Utilizing big data, organizations can gather insights and provide services that would not be possible using conventional data processing techniques. Due to the scale involved, however, utilizing big data presents various technical challenges to process the massive volumes of data. Existing big data software frameworks used to facilitate the distributed storage and processing of large datasets present various technical shortcomings, particularly with regard to the amount of time required to execute a query and provide the resulting dataset back to the requesting user. For example, using prior big data techniques, executing these queries and returning the results to the end user often takes an unacceptably long amount of time (e.g., 5-10 minutes or more), making prior big data techniques unsuitable for use in various "online" applications.

BRIEF DESCRIPTION OF THE DRAWINGS

FIG. 4 is a flow diagram illustrating an example method for simulating modifications to one or more fraud detection filters, according to some embodiments.

FIG. 5 is a flow diagram illustrating an example method for executing queries in an online manner, according to some embodiments.

DETAILED DESCRIPTION

Figure 1:
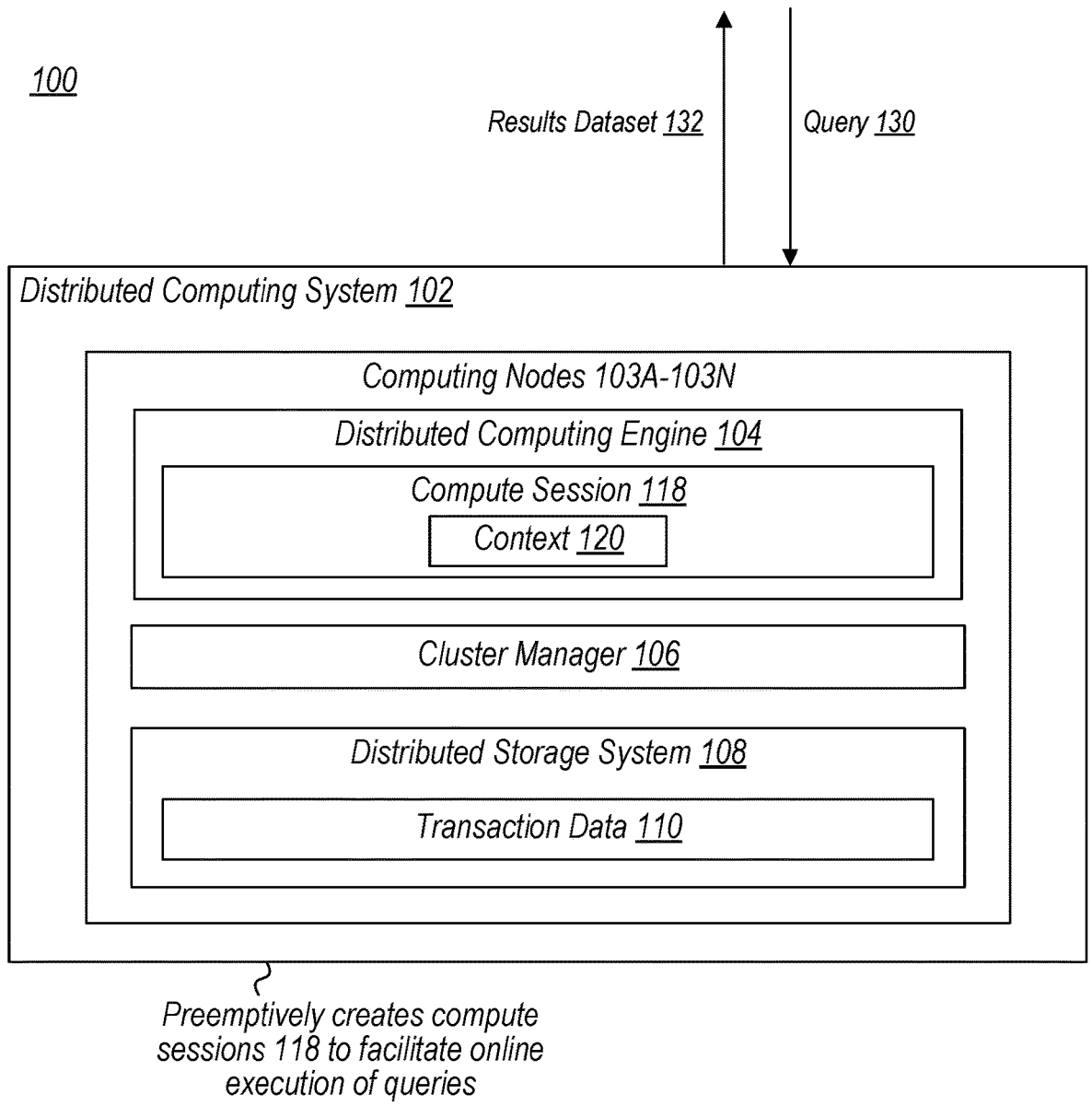
FIG. 1 is a block diagram illustrating an example distributed computing system, according to some embodiments.

With the proliferation of web services and the decline in the cost of data storage, many organizations (e.g., providers of web services) are collecting and storing increasingly large amounts of data. This scenario, referred to as "big data," is often characterized by the collection of a variety of types of data, both in high volumes (e.g., gigabytes, terabytes, etc.) and at a high velocity (e.g., daily, hourly, etc.). Utilizing big data, organizations can gather insights and provide services that would not be possible using conventional data processing techniques. As a non-limiting example, for an organization that provides fraud detection services (e.g., attendant to an online payment service), the use of big data can allow the organization to detect and prevent fraudulent activity that would otherwise have gone unnoticed.

Due to the scale involved, however, utilizing big data presents various technical challenges, for example to store, "clean," and process the massive volumes of data. To address these concerns, various big data software frameworks, such as the Apache™ Hadoop framework and various supporting big data software utilities provided by Apache™, have emerged to facilitate the distributed storage and processing of large datasets. Prior big data techniques also present various technical shortcomings, however, particularly in the context of providing "online" web services. Consider, for example, a server system that maintains one or more large datasets and provides a web service that executes a user-specified query against this big data. Using prior big data techniques, executing these queries and returning the results to the end user would take an unacceptably long amount of time (e.g., 5-10 minutes or more), making prior big data techniques unsuitable for use in online web services.

In various embodiments, however, the disclosed systems and methods solve these and other technical problems by enabling the efficient online execution of queries against large data volumes. For example, in some embodiments, a server system includes a distributed computing system with a distributed storage system operable to store transaction data associated with multiple users, and a distributed computing engine that is operable to perform distributed processing jobs based on the transaction data. In some embodiments, the system preemptively creates one or more compute sessions on the distributed computing engine, where a compute session provides access to one or more of the various functionalities of the distributed computing engine. That is, in some embodiments, the system creates one or more compute sessions in a proactive manner before receiving a data request (e.g., from a client device) that the system will service using the one or more compute sessions. By preemptively creating these compute sessions, the distributed computing engine has compute sessions that are running and available whenever a client request is received, eliminating the (often time-consuming) process of creating a compute session in a reactive manner after a client request has been received. Further, in various embodiments, the disclosed systems store the users' transaction data in a column-oriented data storage format (e.g., Apache™ Parquet) that facilitates fast and efficient data retrieval, further increasing the speed with which the disclosed techniques are capable of executing queries. Additionally, in various embodiments, the disclosed system includes a service that is capable of generating queries, based on user-provided parameters, in a format (e.g., Apache™ Hive format) that can be directly used by the distributed computing engine (that is, without further processing on the part of the distributed computing engine to generate a query). In various embodiments, the disclosed techniques include using preemptively created compute sessions to execute queries against the transaction data in a fast, efficient manner and returning the results dataset back to the requesting client device in an online manner, as described in more detail below. Thus, in various embodiments, the disclosed systems and methods enable the execution of queries against large datasets in an online manner, extending the capabilities of the distributed computing system, improving the functioning of the distributed computing system and the operation of the server system in which it is deployed as a whole.

In FIG. 1, block diagram 100 depicts a distributed computing system 102, which, in various embodiments, may be used to execute queries in an online manner. For example, in some embodiments, distributed computing system 102 may be deployed within a larger server system (as described in more detail below with reference to FIG. 2) and used to enable online execution of queries as part of one or more web services. Performing queries in an online manner may be advantageous in numerous different contexts. In one non-limiting embodiment, which is described in more detail below with reference to FIG. 2, a fraud detection service may execute queries in an online manner to allow a user to "simulate" modifications to fraud detection filters implemented by the fraud detection service on behalf of the user. Prior big data processing techniques operate in an "offline" manner, however, making them poorly suited for use in such a context. For example, utilizing prior big data processing techniques, each such simulation would be a time-intensive process lasting, for example, 5-10 minutes (or more) per simulation. Given the inherently iterative process of testing multiple changes (and, potentially, testing multiple filters), the time delays associated with executing the queries accumulate such that performing filter testing is not practical or feasible using prior techniques. (Note, however, that this embodiment is provided merely as one non-limiting example. In other embodiments, the disclosed systems and methods may be used to execute queries in an online manner in any suitable context, as desired.)

The disclosed techniques, by contrast, utilize the hardware and software resources of the distributed computing system 102 to execute a query 130 against transaction data 110 to generate a results dataset 132 in an "online" manner. As used herein, an "online" web service is one that provides requested data to the requesting entity (e.g., a client device, software application, etc.) within a particular time threshold (e.g., 3 seconds, 5 seconds, 10 seconds, etc.) such that the web service may be used in an interactive manner by the requesting entity. In doing so, such web services may be said to operate in an "online" manner. Stated differently, in some embodiments, operating in an "online" manner may include generating the results dataset 132 in "real-time" or "semi real-time" such that the results dataset 132 may be provided to the requesting entity (e.g., client device) without significant delay (e.g., one or more minutes of delay). Although the exact time required to execute a given query 130 will vary, as used herein, executing a query 130 in an "online" manner refers to generating the results dataset 132 based on the query 130 within 30 seconds, avoiding excessive delays between the time at which a query 130 is received by the distributed computing system and the time at which the results dataset 132 is generated.

In the depicted embodiment, distributed computing system 102 provides a distributed computing framework that utilizes a cluster of computing nodes 103A-103N to host a distributed computing engine 104, cluster manager 106, and distributed storage system 108. In various embodiments, computing nodes 103 may be implemented using one or more physical or virtual machines operable to store data and perform various data processing operations to implement the disclosed distributed computing framework. In one embodiment, for example, computing nodes 103 may be implemented using one or more "commodity" machines, such as server computer systems residing in a datacenter.

Distributed computing engine 104, in various embodiments, is a general-purpose cluster computing engine capable of performing large-scale data processing operations in a simple and efficient manner. In various embodiments, distributed computing engine 104 may be implemented using any of various suitable technologies, such as Apache™ Spark or Apache™ MapReduce. In various embodiments, distributed computing engine 104 is operable to receive the query 130, fetch the appropriate transaction data 110 from the distributed storage system 108, filter the transaction data 110 based on the query 130, and return the results dataset 132 to the requesting device or service. As described in more detail below with reference to FIG. 3, distributed computing engine 104, in various embodiments, is operable to generate (e.g., using the Apache™ Spark SQL engine) a query execution plan for a given query 130, which divides the query 130 into a number of tasks that can be performed concurrently. For example, in various embodiments, distributed computing engine 104 has access to information corresponding to the distributed storage system 108 from which the appropriate transaction data 110 needs to be fetched and the resources available (e.g., RAM, CPU availability, etc.) on the cluster of computing nodes 103. Based on this information, in some embodiments, distributed computing engine 104 can identify how many tasks can be run at one time based on the available resources and the number of tasks that can be performed in parallel.

In various embodiments, distributed computing system 102 is operable to preemptively create one or more compute sessions 118 on the distributed computing engine 104 to facilitate the online execution of queries 130. In various embodiments, a compute session 118 provides a unified entry point to interact with the underlying functionality provided by the distributed computing engine 104 and allows an application to utilize the various APIs provided by the distributed computing engine 104. Stated differently, in various embodiments, a compute session 118 (or simply a "session 118") provides a way to send commands and data to an application running on the distributed computing engine 104. In embodiments in which the distributed computing engine 104 is Apache™ Spark, for example, creating a session 118 may include instantiating a SparkSession object along with one or more associated contexts 120 (e.g., SparkContext, SQLContext, HiveContext, etc.) using the SparkSession.Builder class, allowing the SparkSession object to trigger Spark jobs, Hive queries, etc. In various embodiments, a session 118 (e.g., a SparkSession object) represents a processing environment with information acquired through one or more contexts 120 (e.g., a SparkContext). As one non-limiting example, in some embodiments a context 120 is a configuration that includes information about the computing resources (e.g., number of CPUs, amount of memory, etc.) required for processing by the distributed computing engine 104. In various embodiments, a context 120 is created on an application's driver process and may be shared between multiple sessions 118. Further, in various embodiments, a context 120 may act as an entry point for low-level API functionality, where the context 120 is accessible through the session 118. For example, in embodiments in which the distributed computing engine 104 is implemented using Apache™ Spark, context 120 may be a Spark Context and represent the connection to a Spark cluster, used to create RDDs, accumulators, and to broadcast variables on that cluster.

Cluster Manager 106, in various embodiments, is operable to perform various resource-management operations for the distributed computing system 102, such as monitoring the status of the computing resources that are available on the computing nodes 103A-103N. In various embodiments, cluster manage 106 may be implemented using any of various suitable technologies, including YARN (part of the Apache™ Hadoop framework), the cluster manager provided as part of the Apache™ Spark framework, Apache™ Mesos, or any other suitable alternative. In various embodiments, cluster manager 106 is operable to allocate resources, including data and tasks, to various computing nodes 103 in the distributed computing system 102. For example, in various embodiments, cluster manager 106 is operable to distribute the tasks specified by an application's driver process among the multiple executor processes, as described in more detail below with reference to FIG. 3.

In the depicted embodiment, distributed computing system 102 further includes distributed storage system 108. In various embodiments, distributed storage system 108 is operable to store transaction data 110 across one or more of the computing nodes 103. For example, in some embodiments, portions of the transaction data 110 may be distributed across and stored in physical storage devices (e.g., hard drive disks) of one or more of the computing nodes 103. Further, in various embodiments, the transaction data 110 may be redundantly stored such that a given portion of the transaction data 110 is stored on multiple computing nodes 103, providing protection in the event that one or more of the computing nodes 103 fails and providing higher data availability to facilitate parallel computing operations.

In various disclosed embodiments, distributed storage system 108 is used to store transaction data 110 associated with one or more users of the server system 202. Transaction data 110 may be stored in any of various formats. For example, in some embodiments, transaction data 110 may be stored in a column-oriented data storage format using, for example, one or more Apache™ Parquet files or Apache™ HBase. As used herein, the term "transaction" broadly refers to any computing activity performed by a computer system on behalf of a user, and the term "transaction data," accordingly, refers to any of various items of data corresponding to such transactions. In one non-limiting example, for instance, a "transaction" may include a user modifying data maintained by a computer system. In this example, corresponding "transaction data" may correspond to any of various items of information associated with that transaction, such as an identifier (e.g., a key value) associated with the data the user modified, the time at which the user modified the data, the manner in which the data was modified, etc. Other non-limiting examples of transactions include accessing a user account with the computer system, accessing a service hosted by the computer system, or any other suitable computing activity. In various embodiments, the transactions that may be performed on a particular computer system will vary depending on the nature of that computer system and the services it provides. Note that the term "transaction" may include computing activity that is financial in nature or non-financial in nature. Throughout this disclosure, the term "financial transaction" is used to refer to a transaction that is financial in nature (e.g., transferring funds from one account to another using an online payment service). Further note that, although distributed storage system 108 is shown storing only transaction data 110, this simplified example is provided merely as one non-limiting embodiment. In other embodiments, distributed storage system 108 may store any of various types of data in addition to (or instead of) transaction data 110. Additionally, although the disclosed techniques are primarily described in the context of executing queries against transaction data 110, the scope of the present disclosure is not limited to such embodiments. Instead, in various embodiments, the disclosed techniques may be used to execute queries against any suitable type of data stored in a distributed storage system 108 of a distributed computing system 102.

Figure 2:
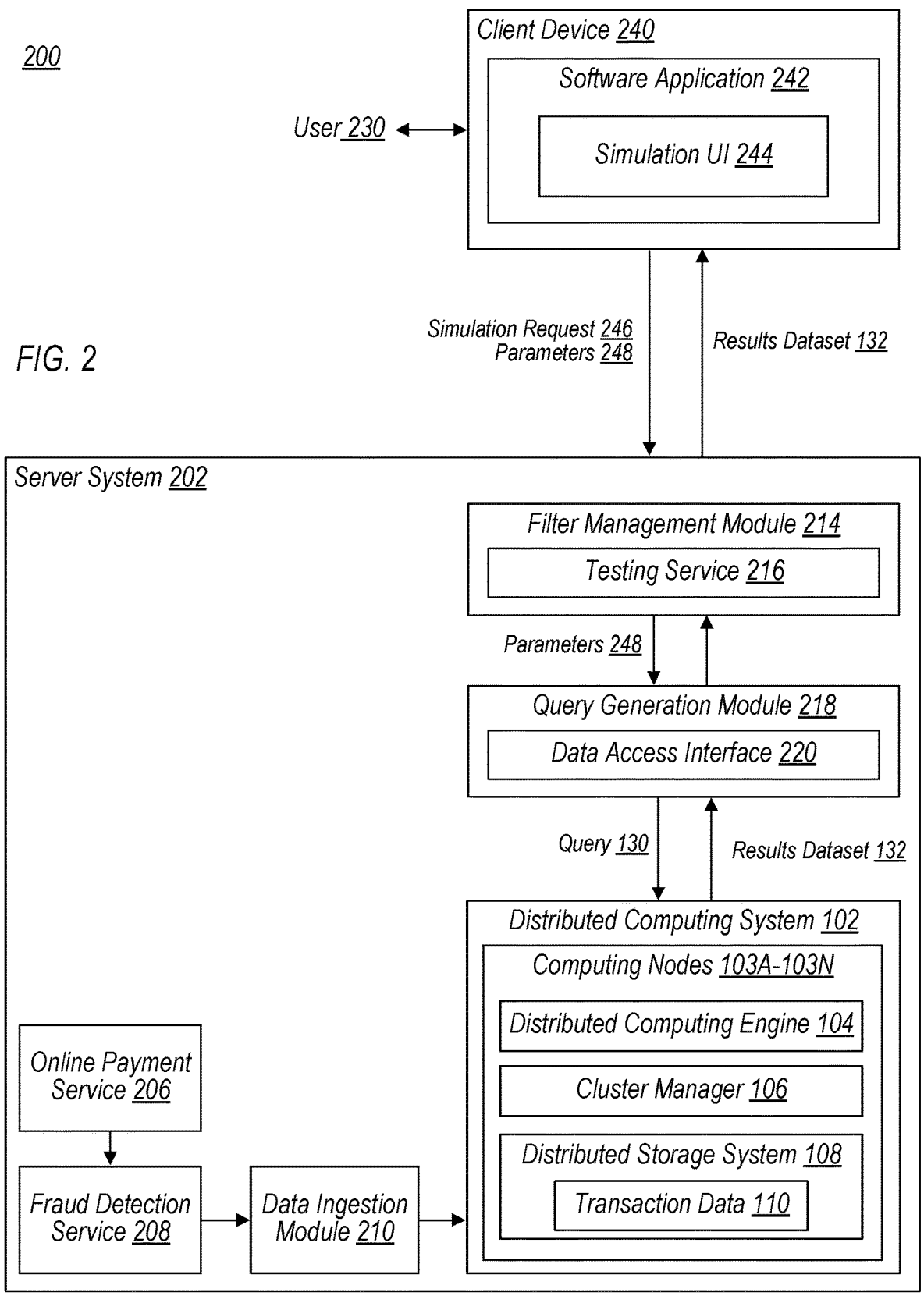
FIG. 2 is a block diagram illustrating an example server system, according to some embodiments.

Turning now to FIG. 2, block diagram 200 depicts an example server system 202 configured to execute queries 130 in an online manner, according to some embodiments. For example, in the non-limiting embodiment of FIG. 2, server system 202 is operable to provide an online payment service 206 that may be used by to perform financial transactions. For instance, in some embodiments, merchants may use online payment service 206 to receive funds from consumers during financial transactions. In FIG. 2, block diagram 200 depicts a user 230, which may be a merchant that utilizes the online payment service 206 provided by server system 202 to receive payment from consumers. In the depicted embodiment, in addition to providing the online payment service 206, server system 202 also provides a fraud detection service 208 that is operable to implement one or more fraud detection filters (also referred to as "fraud detection rules") for financial transactions associated with one or more users of the server system 202 (such as user 230) to detect and prevent fraudulent financial transactions from being performed via the online payment service 206.

In various embodiments, a given fraud detection filter implemented by fraud detection service 208 may include one or more evaluation criteria (e.g., number of financial transactions performed from a single IP address during a given time period) and one or more parameter values for those evaluation criteria (e.g., 10 or more financial transactions performed from the single IP address in a 24 hour period). In some instances, a user 230 may wish to make modifications to a fraud detection filter, for example by changing the value of one or more parameters, adding an evaluation criteria, or removing an evaluation criteria. For example, in some instances, fraudulent techniques utilized by malicious actors may evolve over time, rendering ineffective (or less effective) previously designed and implemented fraud detection filters. To combat this, a user 230 may wish to modify one or more parameter values for one or more of the evaluation criteria in a fraud detection filter (or multiple filters) in an effort to increase its efficacy. Rather than blindly implementing the modified fraud detection filter, however, the user 230 may wish to first test how the modified filter would have performed in the past. In various embodiments, server system 202 facilitates this online fraud detection filter testing by simulating the performance of the modified filter based on transaction data 110 associated with the user 230.

For example, in the depicted embodiment, server system 202 includes filter management module 214, which, in various embodiments, provides various services to enable users (such as user 230) to establish, customize, and test fraud detection filters implemented by the fraud detection service 208. In some embodiments, for example, filter management module 214 may provide (e.g., as part of one or more webpages) data usable to populate a simulation UI 244 on the client device 240, allowing the user to visualize the efficacy of fraud detection filters over a selected time period (e.g., 3 months, 6 months, 12 months, etc.). Client device 240 may be any of various suitable computing devices, such as a laptop computer, desktop computer, tablet computer, smartphone, etc. that user 230 may use to access server system 202. In the depicted embodiment, client device 240 executes software application 242, such as a web browser or dedicated software application, operable to present a simulation UI 244 provided by the filter management module 214 of the server system 202.

In FIG. 2, filter management module 214 includes testing service 216, which, in various embodiments, is operable to enable the user 230 to test proposed changes to one or more fraud detection filters against transaction data 110 associated with that user 230 so that he or she may verify the viability of a new fraud detection filter, or a modification to an existing fraud detection filter, prior to its implementation by the fraud detection service 208. For example, in the depicted embodiment, user 230 provides, via simulation UI 244, a simulation request 246 that includes one or more parameters 248 for one or more fraud detection filters. In various embodiments, the simulation request 246 specifies all of the parameters 248 for the one or more fraud detection filters that the user 230 wishes to test at a given time. (Note that, in some embodiments, server system 202 is operable to provide filter testing for multiple fraud detection filters at a time. Additionally, in various embodiments, simulation request 246 may identify the one or more fraud detection filters being tested and the evaluation criteria to which the one or more parameters 248 correspond.) Simulation request 246 and parameters 248 may be specified using any of various suitable formats. For example, in some embodiments, simulation request 246 may be an HTTP message and the one or more parameters 248 may be specified in JavaScript Object Notation (JSON) format. Note, however, that this embodiment is provided merely as one non-limiting example and, in other embodiments, any other suitable formats or protocols may be used.

In the depicted embodiment, the testing service 216 passes the parameters 248 (e.g., in JSON format) to the query generation module 218. In various embodiments, query generation module 218 is operable to generate a query 130 based on the one or more parameters 248 included in the simulation request 246. That is, in some embodiments, query generation module 218 is operable to parse the JSON message containing the parameters 248 and, based on those parameters 248, generate a corresponding query 130. For example, in some embodiments, distributed computing system 102 may include software (e.g., Apache™ Hive or any other suitable alternative) that facilitates querying large datasets stored in distributed storage system 108 using SQL-like statements (rather than attempting to query the datasets using low-level query Java™ APIs directly supported by the distributed computing engine 104). In one non-limiting embodiment, query generation module 218 is operable to specify the query 130 using the Apache™ Hive Query Language (HQL), though, as will be appreciated by one of skill in the art with the benefit of this disclosure, other suitable formats may be used.

In the depicted embodiment, query generation module 218 includes data access interface 220. Data access interface 220, in various embodiments, is a driver that provides connectivity to the data stored in the distributed storage system 108 and enables queries 130 to be sent to the distributed computing system 102. For example, in some embodiments, data access interface 220 is implemented as a Java Database Connectivity (JDBC) driver that provides various methods to query and update data stored in the distributed storage system 108. In embodiments in which the distributed computing system 102 utilizes Apache™ Hive, the data access interface 220 may be a Hive/JDBC adaptor. Note that, in some embodiments, data access interface 220 has additional features, such as connection pooling and connection refreshing capabilities, to ensure better resilience and fault tolerance in instances in which the distributed computing system 102 experiences a failure.

Once it receives the query 130 from the query generation module 218, distributed computing system 102 may utilize the distributed computing engine 104 to execute the query 130 against the transaction data 110 stored in the distributed storage system 108, as described in more detail below with reference to FIG. 3. Note that the nature of the transaction data 110 may vary depending on the nature of, and the service(s) provided by, the server system 202 in which the distributed computing system 102 is implemented. In the non-limiting embodiment depicted in FIG. 2, for example, distributed computing system 102 is used to simulate modifications to fraud detection filters implemented by the fraud detection service 208 provided by the server system 202. As such, in the depicted embodiment, the transaction data 110 may include various items of data relating to financial transactions associated with the user 230 performed using the online payment service 206 (e.g., payments made to the merchant user 230 by various consumers). In various embodiments, this transaction data may include one or more of the following types of transaction data: transaction ID numbers, transaction dates, transaction times, transaction location, consumer IP address, consumer account ID, financial instrument identifier, merchant account ID, transaction amount, transaction risk score, fraud detection assessment (e.g., approved or denied), billing address, shipping address, consumer primary residence, merchant primary residence, or any of various other items of transaction data. Note, however, that these are merely non-limiting examples and are not intended to limit the scope of the present disclosure. In various embodiments, the transaction data (and, more broadly, transaction data 110) may include any suitable type of data using any number and type of data fields.

In some embodiments, server system 202 may record values for numerous (e.g., 50, 100, 1000, etc.) data fields for each financial transaction performed using the online payment service 206. In the depicted embodiment, for example, fraud detection service 208 may "publish" various items of transaction data to data ingestion module 210 for each financial transaction (or all transactions satisfying one or more specified criteria) that the fraud detection service 208 evaluates (e.g., applies one or more fraud detection filters). Data ingestion module 210, in various embodiments, is operable to receive this transaction data from fraud detection service 208 and temporarily store the data until it can be extracted and stored in the distributed storage system 108 of the distributed computing system 102. Data ingestion module 210 may be implemented using any of various suitable technologies, such as Apache™ Kafka. As described in more detail below with reference to FIG. 3, distributed computing system 102 may retrieve this transaction data from the data ingestion module 210 and store it in the distributed storage system 108.

As described in more detail below with reference to FIG. 3, distributed computing system 102 may execute the query 130 against the transaction data 110 and return the results dataset 132 in an online manner. In the depicted embodiment, note that the execution of the query 130 against the transaction data associated with the user 230 may serve to "simulate" the performance, over a specified time period, of the one or more fraud detection filters being tested. That is, by executing the query 130, the distributed computing system 102 is able to determine how the modified fraud detection filter(s) would have performed over a particular time period (specified, for example, as one of the parameters 248) based on the actual transaction data for financial transactions associated with the merchant user 230. Non-limiting examples of such performance indicators include approval rates, rejection rates, chargebacks, payment total, volume, or any of various other suitable performance indicators. In various embodiments, these simulation results (e.g., results dataset 132) may be provided back to the client device 240, where they may be presented to the user 230 via the simulation UI 244. For example, in some embodiments, the simulation UI 244 may present the simulation results dataset 132 using one or more visualization components that graphically depict the performance of both the existing fraud detection filter and the simulated performance of the modified fraud detection filter on the same component, facilitating easier comparison by user 230. The user 230 may then determine whether to implement the modified version of the fraud detection filter(s), test additional modifications to the fraud detection filters, or leave the filters as they were, as desired.

Note that, although described with reference to an online payment service 206 and fraud detection service 208 in FIG. 2, this embodiment is provided merely as one non-limiting example. In other embodiments, the disclosed systems and methods for online execution of queries may be used in any of various suitable contexts, either alone or as part of one or more other web services. Further note that, in some embodiments, various components of the server system 202 (e.g., filter management module 214, query generation module 218, etc.) may be implemented using a single machine. In other embodiments, however, one or more of the components of the server system 202 may be implemented using multiple machines executing, for example, at one or more datacenters.

Figure 3:
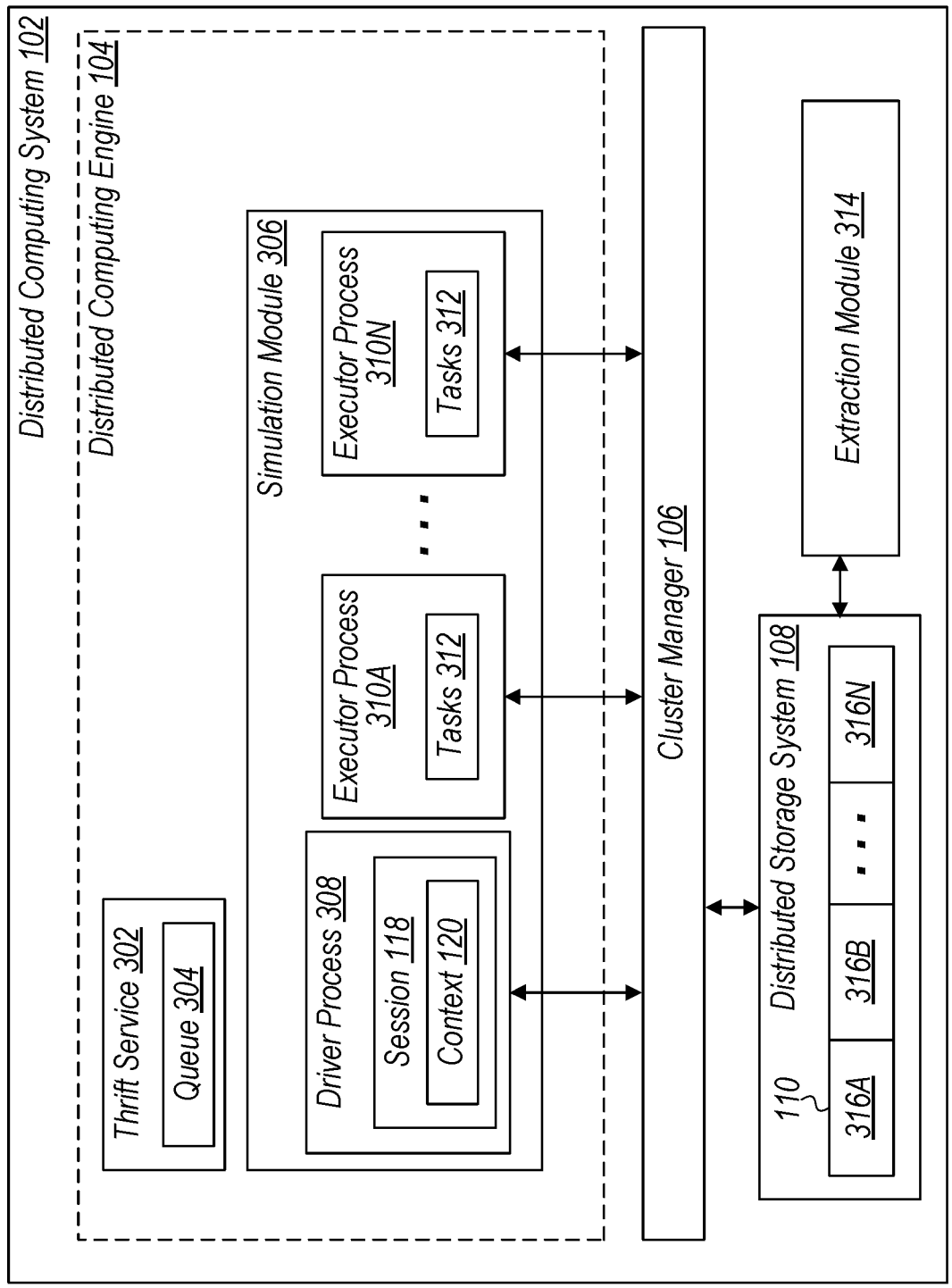
FIG. 3 is a block diagram illustrating a detailed view of an example distributed computing system, according to some embodiments.

FIG. 3 depicts a more detailed block diagram of an example distributed computing system 102, according to some embodiments. More specifically, in the embodiment depicted in FIG. 3, distributed computing engine 104 further includes thrift service 302 and simulation module 306, which includes driver process 308 and multiple executor processes 310A-310N. Further, in FIG. 3, distributed computing system 102 includes extraction module 314, and the transaction data 110 is stored in various partitions 316A-316N on the distributed storage system 108. (Note that, in FIG. 3, computing nodes 103A-103N have been omitted, for clarity.)

Thrift service 302, in various embodiments, provides an interface (e.g., a JDBC interface) to one or more modules within the server system 202, such as the query generation module 218, to provide access to one or more compute sessions 118 and execute queries 130 using distributed computing engine 104. Further, in some embodiments, thrift service 302 is operable to preemptively create one or more compute sessions 118 and contexts 120 on the distributed computing engine 104. For example, in some embodiments, thrift service 302 accesses configuration data identifying the master node and the worker nodes. In some embodiments, the configuration data includes the context information, which provides details regarding the configuration of distributed compute engine 104, and starts a session 118 so that a compute session 118 is ready and available to service incoming queries 130 as they are received from one or more client devices 240. Additionally, in various embodiments, thrift service 302 maintains a queue 304 of queries 130. For example, thrift service 302 may receive queries 130 from query generation module 218 and route those queries 130 into the queue 304, where they may be temporarily maintained until picked up for execution by the distributed computing engine 104. In some embodiments, at least a portion of the thrift service 302 may be implemented using Apache™ Thrift. Note, however, that this embodiment is provided merely as one non-limiting example and, in other embodiments, any of various suitable alternatives may be used.

In the embodiment of FIG. 3, distributed computing engine 104 is shown executing simulation module 306, which, in various embodiments, is operable to execute a query 130 against transaction data 110 stored in the distributed storage system 108. During operation, in various embodiments, simulation module 306 includes driver process 308 and one or more executor processes 310A-310N. Driver process 308, in various embodiments, runs the main( ) function of the simulation module 306 and is operable to maintain information about the simulation module 306 and analyze, distribute, and schedule work across one or more of the executor processes 310A-310N. In various embodiments, an executor process 310 is a process launched for the simulation module 306 that is responsible for performing one or more tasks 312 assigned to it by the driver process 308, storing data, and reporting the state of its performance (e.g., results from the one or more tasks 312) back to the driver process 308 as part of a big data processing job. The number of executor processes 310 used to execute a query 130 may vary, for example depending on the complexity of the query 130 or the size of the partition(s) 316 in which the user 230's data is stored. In various embodiments, driver process 308 selects and distributes different tasks 312 to the different resources (e.g., executor processes 310 running on one or more computing nodes 103) to be performed, where each task 312 achieves some (potentially small) portion of the overall processing job. Driver process 308 may then consolidate the results of these many tasks 312, from the executor processes 310A-310N, into the results dataset 132, which may then be provided to the requesting client device (e.g., client device 240) or service (e.g., a service in the same server system in which the distributed computing system 102 is implemented).

Note that, in various embodiments, the simulation module 306 may be hosted on a single computing node 103 or on multiple computing nodes 103 within the distributed computing system 102. For example, in some embodiments, simulation module 306 may be utilized in a "local" mode in which the driver process 308 and the executor processes 310A-310N are executed on a single computing node 103 within the distributed computing system 102. In other embodiments, however, simulation module 306 may be utilized in a "cluster" mode in which the driver process 308 and the executor processes 310A-310N are executed using multiple nodes 103 of the distributed computing system 102.

Distributed computing system 102 of FIG. 3 further includes extraction module 314, which, in various embodiments, is operable to retrieve transaction data 110 (which may correspond to financial or non-financial transactions) from the data ingestion module 210 and store it in the distributed storage system 108 of the distributed computing system 102. In some embodiments, extraction module 314 is operable to store the transaction data 110 in a columnar format (e.g., Apache™ Parquet or any other suitable alternative), which may facilitate faster querying of the transaction data 110.

Further, in some embodiments, extraction module 314 is operable to store the transaction data in partitions 316A-316N that are specific to a particular user of the server system 202. For example, in some embodiments, the transaction data 110 associated with user 230 may be stored in a one or more partitions 316 that are reserved for the user 230, such as partition 316A. In some such embodiments, when the simulation module 306 then executes the query 130, it may do so against only the data in the partition 316A in which data for the user 230 is stored, rather than executing the query 130 against all of the data stored in the distributed storage system 108, further increasing the speed with which the distributed computing engine 104 can execute the query 130. As used herein, the term "partition" refers to a collection of one or more rows of transaction data 110 that are associated with a particular user and that are stored on one or more of the computing nodes 103 in the distributed computing system 102. In various embodiments, storing transaction data 110 in partitions 316 may further increase the speed with which the distributed computing system 102 is able to execute queries 130 by enabling multiple executor processes 310 to access transaction data 110 in parallel.

Example Methods

Referring now to FIG. 4, a flow diagram illustrating an example method 400 for simulating modifications to one or more fraud detection filters in an online manner is depicted, according to some embodiments. In various embodiments, method 400 may be performed by one or more elements of server system 202 of FIG. 2, such as distributed computing system 102, filter management module 214, query generation module 218, etc., to simulate modifications to one or more fraud detection filters implemented by fraud detection service 208 on behalf of a user 230. For example, server system 202 may include (or have access to) a non-transitory, computer-readable medium having program instructions stored thereon that are executable by one or more processors within the server system 202 to cause the operations described with reference to FIG. 4. In FIG. 4, method 400 includes elements 402-412. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, server system 202 provides, to a client device 240, interface data for a simulation user interface 244 that allows a user 230 of the client device 240 to simulate one or more modifications to a fraud detection filter prior to requesting that the modified version of the fraud detection filter be implemented by the fraud detection service 208. For example, as described above, user 230, in some embodiments, may be a merchant that utilizes the online payment service 206 provided by the server system 202 to receive payments from various customers. In various embodiments, along with providing the online payment service 206, server system 202 may also provide fraud detection service 208, which may implement one or more fraud detection filters to evaluate transactions attempted with the merchant user 230 to detect and, ultimately, prevent fraudulent transactions before they are performed.

At 404, in the illustrated embodiment, the server system 202 receives, from the client device 240, a simulation request 246 that specifies, for a first fraud detection filter utilized by the user 230, one or more modified filter parameters 248. For example, as noted above, the simulation request 246 may indicate modified parameter values for one or more evaluation criteria or add a new evaluation criteria (with a corresponding parameter value) to one or more existing evaluation criteria that are already a part of the fraud detection filter. Further, in some embodiments, the simulation request 246 may indicate that one or more parameters (or evaluation criteria) are to be removed from the fraud detection filter in the modified version.

At 406, in the illustrated embodiment, the server system 202, based on the simulation request 246, generates a query 130 designed to run the simulation on a dataset of historical transaction data corresponding to previous financial transactions associated with the user 230. For example, as described above with reference to FIG. 2, in various embodiments, query generation module 218 is operable to generate query 130 in a SQL-like format, such as Apache™ HQL, that may be used by the distributed computing system 102 to execute the query 130 against the transaction data 110 stored in the distributed storage system 108. At 408, in the illustrated embodiment, the server system 202 routes the query 130 to a distributed computing system 102 that includes: a distributed computing engine 104 on which a compute session 118 (e.g., an Apache™ SparkSession object) has been preemptively created, and a distributed storage system 108 (e.g., Apache™ HDFS) in which the dataset of historical transaction data 110 corresponding to the previous financial transactions associated with the user 230 is stored in a column-oriented file format (e.g., Apache™ Parquet).

At 410, in the illustrated embodiment, the distributed computing engine 104 executes the query 130 against the dataset of historical transaction data 110 using the existing compute session 118 to retrieve a simulation results dataset 132. In some embodiments, for example, the simulation results dataset 132 may include information indicating the performance of the modified fraud detection filter over a particular time period (e.g., 30 days, 60 days, 180 days, or any other suitable user-specified or system provided time period). At 412, in the illustrated embodiment, the server system 202 returns the simulation results dataset 132 to the client device 240 where the performance of the modified fraud detection filter may be presented to the user 230 using the simulation UI 244. In some embodiments, for example, simulation UI 244 may present the simulation results dataset 132 using one or more graphical components that graphically depicts the performance of the modified fraud detection filter(s) over a particular (e.g., user-selected) period of time, such at 1-month, 3-months, 6-months, etc. In various embodiments, user 230 may then determine whether to implement the modified version of the fraud detection filter, test further modifications to the filter, or to reject the modifications and keep the existing fraud detection filter in its current state.

Referring now to FIG. 5, a flow diagram illustrating an example method 500 for executing queries in an online manner is depicted, according to some embodiments. In various embodiments, method 500 may be performed by one or more elements of server system 202 of FIG. 2, such as distributed computing system 102, filter management module 214, query generation module 218, etc., to execute a query 130 against a transaction dataset and return results dataset 132 to a client device 240 in an online manner. For example, server system 202 may include (or have access to) a non-transitory, computer-readable medium having program instructions stored thereon that are executable by one or more processors within the server system 202 to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the server system 202 maintains a distributed computing system 102 that includes a plurality of computing nodes 103A-103N. In the depicted embodiment, the distributed computing system 102 includes a distributed storage system 108 operable to store transaction data associated with a plurality of users (such as user 230), and a distributed computing engine 104 operable to perform distributed processing jobs based on the transaction data.

Note that, in some embodiments, method 500 includes storing, by an extraction service (e.g., provided by extraction module 314 of FIG. 3), the transaction data in the distributed storage system 108 using a column-oriented data storage format, such as the Apache™ Parquet file format. For example, as described above with reference to FIG. 3, in some embodiments, extraction module 314 is operable to retrieve transaction data 110 from a data ingestion module 210 (which may be implemented, for example, using Apache™ Kafka) in a real-time or near real-time manner such that, as the fraud detection service 208 makes fraud detection determinations for transactions associated with user 230 and publishes these determinations (along, potentially, with other items of transaction data 110) to the data ingestion module 210, the extraction module 314 may retrieve this transaction data 110 and store it in the distributed storage system 108. As discussed above, in some embodiments, the transaction data 110 may be stored in the distributed storage system 108 in user-specific partitions 316 that are reserved for particular users. For example, as transaction data 110 associated with user 230 is retrieved from the data ingestion module 210, the extraction module 314 may store that transaction data 110 in a user-specific partition 316A of the distributed storage system 108 that is reserved for the user 230.

At 504, in the illustrated embodiment, the server system 202 preemptively creates a first compute session 118 on the distributed computing engine 104, where the first compute session 118 provides access to one or more of the functionalities of the distributed computing engine 104. At 506, in the illustrated embodiment, the server system 202, subsequent to preemptively creating the first compute session 118, receives a first data request from a client device 240, where the first data request is associated with a first user (e.g., user 230) of the plurality of users. For example, in some embodiments, the server system 202 provides, to the client device 240, interface data for a simulation user interface that is operable to graphically depict simulated results of modifications to fraud detection filters. In some such embodiments, the first data request is a simulation request 246 to simulate a modified version of a first fraud detection filter utilized by the first user 230. As discussed above, in various embodiments, query generation module 218 is operable to generate the query 130 based on one or more of the parameters 248 included in the simulation request 246 prior to routing the query 130 to the distributed computing system 102. In some embodiments, the query generation module 218 is operable to generate the query 130 such that it is specified using the Apache™ Hive Query Language (HQL).

At 508, in the illustrated embodiment, the distributed computing engine 104, using the first compute session 118, executes a query, associated with the first data request, against the transaction data (e.g., transaction data 110) in the distributed storage system 108 to retrieve a results dataset (e.g., results dataset 132). In embodiments in which the transaction data 110 is stored in user-specific partitions 316 in the distributed storage system 108, executing the query 130, in some embodiments, includes retrieving data in the results dataset 132 from the user-specific partition 316A of the distributed storage system 108 that is associated with the first user 230. As discussed above, distributed computing engine 104, in various embodiments, may operate in local mode in which a processing job, such as executing the query 130, is parallelized and executed on a single computing node 103. In other embodiments, however, distributed computing engine 104 may operate in cluster mode in which a processing job, such as executing the query 130, is executed using two or more (and, in some instances, many) of the computing nodes 103A-103N in the distributed computing system 102.

At 510, in the illustrated embodiment, the server system sends the results dataset 132 to the client device 240 in an online manner. Note that, in some embodiments, distributed computing system 102 is operable to run multiple simulations at once using multiple preemptively created compute sessions 118. For example, in some embodiments, while the distributed computing engine 104 is executing at least a portion of the query 130 using the first compute session, method 500 further includes executing, using a second preemptively created compute session 118, a second query, associated with a second user, against the transaction data. Stated differently, in some embodiments, method 500 includes preemptively creating a plurality of compute sessions 118 on the distributed computing engine 104, including a second compute session 118. In some such embodiments, method 500 includes, subsequent to the preemptively creating the second compute session, receiving, from a second client device, a second simulation request to simulate a modified version of a second fraud detection filter utilized by a second user of the plurality of users. Method 500, in some such embodiments, includes the distributed computing engine 104 executing a second query, associated with the second simulation request, against the transaction data 110 using the second compute session 118 to retrieve a second results dataset, where the distributed compute engine 104 executes at least a portion of the second query at the same time that it executes at least a portion of the query 130.

Example Computer System

Figure 6:
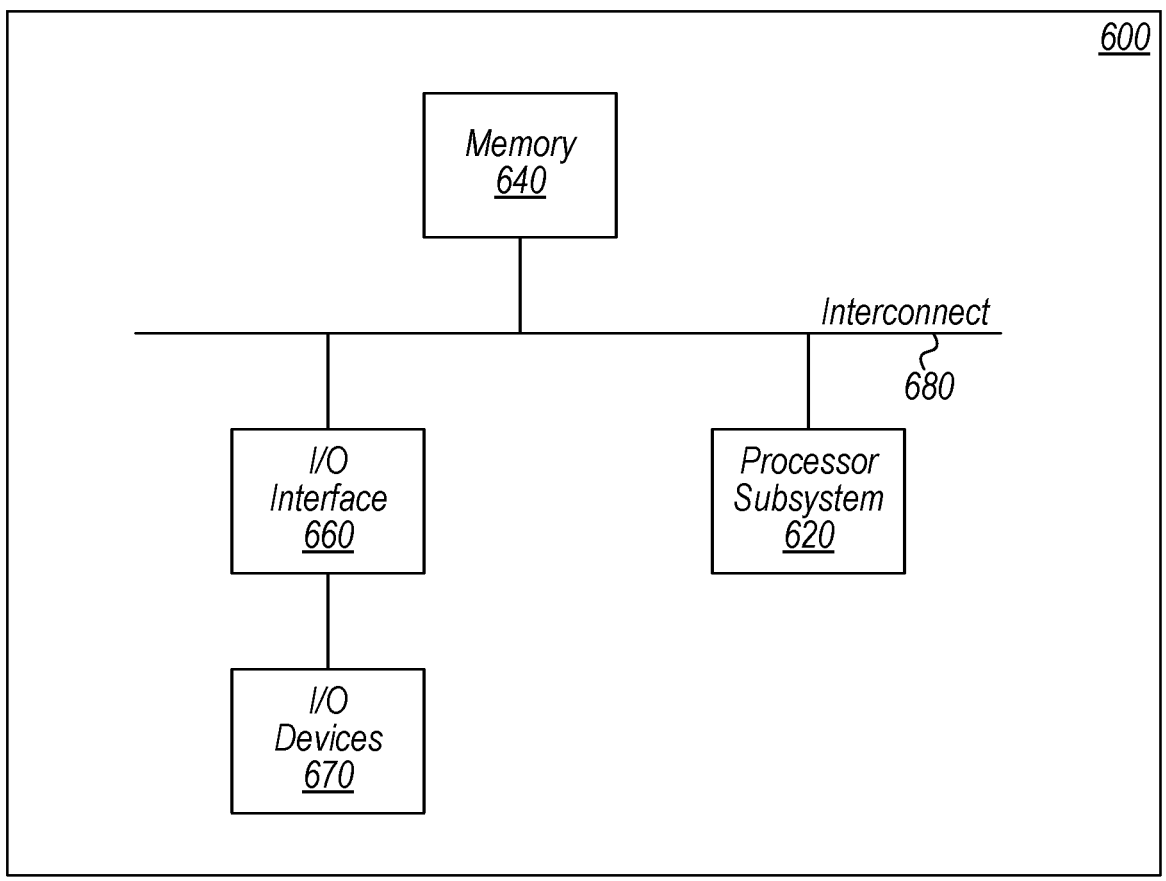
FIG. 6 is a block diagram illustrating an example computer system, according to some embodiments.

Referring now to FIG. 6, a block diagram of an example computer system 600 is depicted, which may implement one or more computer systems, such as one or more of the computing nodes 103 of FIG. 1 or one or more of the computer systems included in server system 202 of FIG. 2, according to various embodiments. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 600 is shown in FIG. 6 for convenience, computer system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable to store program instructions executable by processor subsystem 620 to cause system 600 perform various operations described herein. System memory 640 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 600 is not limited to primary storage such as system memory 640. Rather, computer system 600 may also include other forms of storage such as cache memory in processor subsystem 620 and secondary storage on I/O devices 670 (e.g., a hard drive, storage array, etc.). In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 670 includes a network interface device (e.g., configured to communicate over WiFi, Bluetooth, Ethernet, etc.), and computer system 600 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure et., something physical, such as an electronic circuit))). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used a power supply is not connected to it). Thus, an entity described or recited as "configured to" perform some task refers to something physical, such as a device, circuit:, memory storing program instructions executable to implement the task, etc. s phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., simulation module 306, filter management module 214, query generation module 218, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
maintaining, by a server system, a distributed computing system that includes a plurality of computing nodes, wherein the distributed computing system includes:
a distributed storage system operable to store transaction data associated with a plurality of users; and
a distributed computing engine operable to perform distributed processing jobs based on the transaction data;
preemptively creating, by the server system, first and second compute sessions on the distributed computing engine, wherein the first and second compute sessions provide respective access to one or more functionalities of the distributed computing engine;
subsequent to the preemptively creating the first and second compute sessions, receiving, by the server system from first and second client devices, respective first and second data requests associated with respective first and second users of the plurality of users;
using the first compute session, executing, by the distributed computing engine, a first query associated with the first data request against the transaction data to retrieve a first results dataset;
using the second compute session, executing, by the distributed computing engine, a second query associated with the second data request against the transaction data to retrieve a second results dataset, wherein the distributed computing engine executes at least a portion of the second query at a same time as at least a portion of the first query; and sending, by the server system, the first and second results datasets to the first and second client devices, respectively, wherein the first and second results datasets are returned to the first and second client devices in an online manner.

2. The method of claim 1, further comprising:
storing, by an extraction service in the server system, the transaction data in the distributed storage system using a column-oriented data storage format.

3. The method of claim 2, wherein the column-oriented data storage format is Apache™ Parquet file format.

4. The method of claim 2, wherein the storing includes:
retrieving, by the extraction service, first transaction data associated with the first user from a fraud detection service hosted by the server system; and
storing, by the extraction service, the first transaction data in a user-specific partition of the distributed storage system that is reserved for the first user;
wherein the executing the first query includes retrieving data in the first results dataset from the user-specific partition of the distributed storage system.

5. The method of claim 1, wherein the first data request includes one or more parameters, wherein the method further comprises:
generating the first query based on the one or more parameters prior to routing the first query to the distributed computing engine.

6. The method of claim 5, wherein the first query is specified using Apache™ Hive Query Language (HQL).

7. The method of claim 1, wherein the first results dataset is sent to the first client device, by the server system, within a predetermined time threshold after the first data request is received by the server system; and wherein the first results dataset corresponds to a simulation of one or more fraud detection filters based on the transaction data.

8. The method of claim 1, further comprising:
providing, by the server system to the first client device, interface data for a simulation user interface that is operable to graphically depict simulated results of modifications to fraud detection filters, wherein the first data request is a first simulation request to simulate a modified version of a first fraud detection filter utilized by the first user.

9. The method of claim 8, further comprising:
providing, by the server system to the second client device, the interface data for the simulation user interface, wherein the second data request is a second simulation request to simulate a modified version of a second fraud detection filter utilized by the second user.

10. A non-transitory, computer-readable medium having instructions stored thereon that are executable by a server system to perform operations comprising:
accessing a distributed computing system that includes a plurality of computing nodes, wherein the distributed computing system includes:
a distributed storage system operable to store transaction data associated with a plurality of users; and
a distributed computing engine operable to perform distributed processing jobs based on the transaction data;
preemptively creating a first compute session on the distributed computing engine, wherein the first compute session provides access to one or more functionalities of the distributed computing engine;

subsequent to the preemptively creating the first compute session, receiving, from a client device, a first data request associated with a first user of the plurality of users;

using the first compute session, executing, by the distributed computing engine, a query associated with the first data request against the transaction data to retrieve a results dataset; and sending the results dataset to the client device within a predetermined time threshold after the first data request is received by the server system wherein the results dataset corresponds to a simulation of one or more fraud detection filters based on the transaction data.

11. The non-transitory, computer-readable medium of claim 10, wherein the operations further comprise:

storing, by an extraction service, the transaction data in the distributed storage system using a column-oriented data storage format.

12. The non-transitory, computer-readable medium of claim 11, wherein the storing includes:

retrieving, by the extraction service, first transaction data associated with the first user from a fraud detection service hosted by the server system; and storing, by the extraction service, the first transaction data in a user-specific partition of the distributed storage system that is reserved for the first user;

wherein the executing the query includes retrieving data in the results dataset from the user-specific partition of the distributed storage system.

13. The non-transitory, computer-readable medium of claim 10, wherein the first data request includes one or more parameters, wherein the operations further comprise:

generating the query based on the one or more parameters prior to routing the query to the distributed computing engine.

14. The non-transitory, computer-readable medium of claim 10, wherein the operations further comprise:

while executing at least a portion of the query using the first compute session, executing, by the distributed computing engine using a second preemptively created compute session, a second query, associated with a second user of the plurality of users, against the transaction data.

15. The non-transitory, computer-readable medium of claim 10, wherein the executing the query includes the distributed computing engine executing the query using a single computing node of the plurality of computing nodes.

16. A server system, comprising:

a distributed computing system that includes a plurality of computing nodes, wherein the distributed computing system includes:

a distributed storage system operable to store transaction data associated with a plurality of users; and a distributed computing engine operable to perform distributed processing jobs based on the transaction data;

at least one processor; and a non-transitory, computer-readable medium having instructions stored thereon that are executable by the at least one processor to cause the server system to:

preemptively creating a first compute session on the distributed computing engine, wherein the first compute session provides access to one or more functionalities of the distributed computing engine;

subsequent to preemptively creating the first compute session, providing, to a client device, interface data for a simulation user interface that is operable to graphically depict simulated results of modifications to fraud detection filters;

receive, from the client device, a first data request associated with a first user of the plurality of users, wherein the first data request is a first simulation request to simulate a modified version of a first fraud detection filter utilized by the first user;

using the first compute session, execute, by the distributed computing engine, a query associated with the first data request against the transaction data to retrieve a results dataset; and send the results dataset to the client device.

17. The server system of claim 16, wherein the instructions are further executable to cause the server system to:

retrieve first transaction data associated with the first user from a fraud detection service hosted by the server system; and store the first transaction data in a user-specific partition of the distributed storage system that is reserved for the first user.

18. The server system of claim 17, wherein, to execute the query, the instructions are further executable to cause the server system to:

retrieve data in the results dataset from the user-specific partition of the distributed storage system that is reserved for the first user.

19. The server system of claim 16, wherein the first data request includes one or more parameters, wherein the instructions are further executable to cause the server system to:

generate the query based on the one or more parameters prior to routing the query to the distributed computing engine.

20. The server system of claim 16, wherein the results dataset is sent to the client device within a predetermined time threshold after the first data request is received by the server system; and wherein the results dataset corresponds to a simulation of one or more fraud detection filters based on the transaction data.

* * * * *